United States Patent
King

(10) Patent No.: US 10,225,143 B2
(45) Date of Patent: *Mar. 5, 2019

(54) AUTOMATED ENTRY OF HIDDEN SERVICE-CONFIGURATION MENU FOR TARGET CONFIGURABLE DEVICE SELECTED FROM PLURALITY OF CONFIGURABLE DEVICES IN ROOMS OF HOSPITALITY ESTABLISHMENT

(71) Applicant: Guest Tek Interactive Entertainment Ltd., Calgary (CA)

(72) Inventor: Brian W. King, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 768 days.

This patent is subject to a terminal disclaimer.

(21) Appl. No.: 14/821,578

(22) Filed: Aug. 7, 2015

(65) Prior Publication Data

US 2015/0350017 A1    Dec. 3, 2015

Related U.S. Application Data

(63) Continuation of application No. 13/546,418, filed on Jul. 11, 2012, now Pat. No. 9,106,796, which is a (Continued)

(30) Foreign Application Priority Data

Sep. 17, 2010    (CA) ...................... 2715146

(51) Int. Cl.
*G06F 3/00*    (2006.01)
*G06F 13/00*    (2006.01)
(Continued)

(52) U.S. Cl.
CPC ........ *H04L 41/0813* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 5,396,546 A    3/1995   Remillard
5,565,908 A    10/1996  Ahmad
(Continued)

OTHER PUBLICATIONS

Marshall Brain, "Manna" Chapters 1 and 2, copyrighted 2003-2009, downloaded from http://www.marshallbrain.com/manna1.htm on Aug. 16, 2011.

*Primary Examiner* — Jonathan V Lewis
(74) *Attorney, Agent, or Firm* — ATMAC Patent Services Ltd.; Andrew T. MacMillan

(57) ABSTRACT

A configuration apparatus includes a user interface allowing a user to initiate configuration of at least a target configurable device selected from a plurality of configurable devices. A command module is coupled to the user interface for dynamically generating a sequence of commands required to configure the target configurable device. The sequence of commands includes commands for entering a hidden service-configuration menu of the target configurable device. A communication module is coupled to the command module for transmitting the sequence of commands to the target configurable device.

20 Claims, 6 Drawing Sheets

300

| Device Table | | | |
|---|---|---|---|
| Location | Device | Model number | Configured |
| Room 1 | STB | 1 | No |
| Room 1 | TV | 1 | No |
| Room 2 | STB | 2 | Yes |
| Room 2 | TV | 1 | Yes |
| Room 2 | Blu-ray | 40 | No |
| Room 3 | Blu-ray | 41 | No |
| Room 3 | TV | 2 | Yes |
| ⋮ | | | |
| Room N | STB | 2 | Yes |
| Room N | Blu-ray | 38 | No |
| Room N | Projector | 78 | No |

Related U.S. Application Data continuation of application No. 13/217,825, filed on Aug. 25, 2011, now Pat. No. 8,250,601.

(51) Int. Cl.

| | | |
|---|---|---|
| *H04N 5/445* | (2011.01) | |
| *H04L 12/24* | (2006.01) | |
| *G06F 3/0482* | (2013.01) | |
| *G06F 3/0484* | (2013.01) | |
| *G06Q 50/12* | (2012.01) | |
| *G08C 17/02* | (2006.01) | |
| *G08C 23/04* | (2006.01) | |
| *H04N 7/16* | (2011.01) | |
| *H04N 21/214* | (2011.01) | |
| *H04N 21/422* | (2011.01) | |
| *H04N 21/441* | (2011.01) | |
| *H04N 21/475* | (2011.01) | |
| *H04N 21/485* | (2011.01) | |

(52) U.S. Cl.
CPC ............. *G06Q 50/12* (2013.01); *G08C 17/02* (2013.01); *G08C 23/04* (2013.01); *H04L 41/22* (2013.01); *H04N 7/163* (2013.01); *H04N 21/2143* (2013.01); *H04N 21/42204* (2013.01); *H04N 21/441* (2013.01); *H04N 21/4753* (2013.01); *H04N 21/485* (2013.01); *G08C 2201/30* (2013.01)

(56) References Cited

U.S. PATENT DOCUMENTS

| | | | | |
|---|---|---|---|---|
| 5,734,853 | A * | 3/1998 | Hendricks | H04H 20/06 348/E5.002 |
| 6,868,292 | B2 | 3/2005 | Ficco et al. | |
| 7,073,187 | B1 * | 7/2006 | Hendricks | H04N 5/44543 348/E5.105 |
| 7,363,645 | B1 * | 4/2008 | Hendricks | H04H 20/06 348/385.1 |
| 7,421,654 | B2 | 9/2008 | Wugoski | |
| 7,783,284 | B1 * | 8/2010 | Laux | H04L 41/12 455/411 |
| 7,788,136 | B2 | 8/2010 | Diaz Perez | |
| 7,865,388 | B2 | 1/2011 | Brumbaugh et al. | |
| 7,987,432 | B1 | 7/2011 | Grechishkin et al. | |
| 8,000,454 | B1 | 8/2011 | Or-Bach et al. | |
| 8,015,506 | B2 * | 9/2011 | Fleishman | H04N 5/44508 715/810 |
| 8,175,653 | B2 * | 5/2012 | Smuga | G06F 3/0482 455/566 |
| 8,250,601 | B2 | 8/2012 | King | |
| 8,401,550 | B1 * | 3/2013 | Miller | G06Q 10/02 370/310 |
| 8,600,445 | B2 * | 12/2013 | Park | G06F 1/1626 455/550.1 |
| 9,052,816 | B2 * | 6/2015 | Hashimoto | G06F 3/04845 |
| 9,106,796 | B2 | 8/2015 | King | |
| 2001/0041053 | A1 * | 11/2001 | Abecassis | A63F 13/10 386/291 |
| 2002/0104096 | A1 | 8/2002 | Cramer et al. | |
| 2002/0112250 | A1 | 8/2002 | Koplar et al. | |
| 2003/0229900 | A1 | 12/2003 | Reisman | |
| 2004/0075775 | A1 * | 4/2004 | Maurer, Jr. | H04N 5/63 348/730 |
| 2004/0261097 | A1 * | 12/2004 | Hanks | H04N 21/4108 725/29 |
| 2004/0261110 | A1 | 12/2004 | Kolbeck et al. | |
| 2005/0157217 | A1 | 7/2005 | Hendricks | |
| 2005/0193417 | A1 | 9/2005 | Bankers et al. | |
| 2005/0286435 | A1 | 12/2005 | Ogawa et al. | |
| 2006/0074770 | A1 | 4/2006 | Oreif et al. | |
| 2007/0094679 | A1 * | 4/2007 | Shuster | G11B 27/329 725/31 |
| 2008/0120577 | A1 | 5/2008 | Ma et al. | |
| 2008/0307451 | A1 | 12/2008 | Green | |
| 2009/0254966 | A1 * | 10/2009 | Josephs | H04N 7/17318 725/140 |
| 2009/0275844 | A1 | 11/2009 | Al-Ali | |
| 2010/0017821 | A1 | 1/2010 | Leonov et al. | |
| 2010/0053462 | A1 * | 3/2010 | Candelore | H04N 5/4403 348/734 |
| 2010/0191551 | A1 * | 7/2010 | Drance | G06Q 10/02 705/5 |
| 2010/0199315 | A1 * | 8/2010 | Wang | H04N 5/44543 725/53 |
| 2010/0248787 | A1 | 9/2010 | Smuga et al. | |
| 2010/0302172 | A1 | 12/2010 | Wilairat | |
| 2011/0154418 | A1 | 6/2011 | Cherifi et al. | |
| 2011/0179451 | A1 | 7/2011 | Miles et al. | |
| 2012/0011033 | A1 * | 1/2012 | Salgia | G06Q 30/0643 705/27.2 |
| 2012/0050158 | A1 * | 3/2012 | Ahn | G06F 3/0317 345/157 |
| 2012/0072951 | A1 | 3/2012 | King | |

\* cited by examiner

300

| Device Table | | | |
|---|---|---|---|
| Location | Device | Model number | Configured |
| Room 1 | STB | 1 | No |
| Room 1 | TV | 1 | No |
| Room 2 | STB | 2 | Yes |
| Room 2 | TV | 1 | Yes |
| Room 2 | Blu-ray | 40 | No |
| Room 3 | Blu-ray | 41 | No |
| Room 3 | TV | 2 | Yes |
| ⋮ | ⋮ | ⋮ | ⋮ |
| Room N | STB | 2 | Yes |
| Room N | Blu-ray | 38 | No |
| Room N | Projector | 78 | No |

Command Sequence Table

| Device | Model number | Interface type | Code Set | Hidden config menu command sequence | Additional install script |
|---|---|---|---|---|---|
| STB | 1 | Radio | A4E | STOP, 1, 4, CLEAR | 1. Set room number<br>2. Set controller IP address<br>3. Set peripheral communication type(s) |
| STB | 2 | IR | 5F | MENU, 8, 2, Up, Up, 3, 2, 9 | 1. Set room number<br>2. Set controller IP address<br>3. Set peripheral communication type(s)<br>4. Disable automatic screen saver |
| STB | 3 | LAN | | VolUp, VolUp, 4, 3, 9, CLEAR | 1. Set room number<br>2. Set controller IP address<br>3. Set peripheral communication type(s) |
| STB | 4 | IR | 5E | MENU, 8, 2, Up, Up, 2, 3, 5 | 1. Set room number<br>2. Set controller IP address<br>3. Set peripheral communication type(s) |
| TV | 1 | IR | 3D | VolUp, VolUp, 4, 3, 8, CLEAR | 1. Set STB communication type |
| TV | 2 | IR | 3D | VolUp, VolDown, Menu, 8, CLEAR | 1. Set STB communication type<br>2. Limit maximum volume |
| TV | 46 | Radio | B33 | VolUp, VolUp, 4, 3, 8, CLEAR | 1. Set STB communication type |
| ⋮ | | | | | |
| Blu-ray | 38 | IR | A9 | PLAY, PLAY, 9, 9, 9 | 1. Set STB communication type |
| Blu-ray | 40 | IR | A9 | STOP, STOP, 4, 3, 3, ENTER | 1. Set STB communication type |
| Blu-ray | 41 | IR | A8 | STOP, MENU, 3, PLAY | 1. Set STB communication type |
| Projector | 3 | IR | 10 | STOP, MENU, 3, PLAY | 1. Set STB communication type |
| Projector | 78 | Radio | 457 | STOP, MENU, 3, STOP, MENU | 1. Set STB communication type |

FIG. 4

AUTOMATED ENTRY OF HIDDEN SERVICE-CONFIGURATION MENU FOR TARGET CONFIGURABLE DEVICE SELECTED FROM PLURALITY OF CONFIGURABLE DEVICES IN ROOMS OF HOSPITALITY ESTABLISHMENT

CROSS-REFERENCE TO RELATED APPLICATIONS

This application is a continuation of U.S. patent application Ser. No. 13/546,418 filed Jul. 11, 2012, which is a continuation of U.S. patent application Ser. No. 13/217,825 filed Aug. 25, 2011, which claims the benefit of Canadian Patent Application No. 2,715,146 filed Sep. 17, 2010. Each of these applications are incorporated herein by reference.

BACKGROUND OF THE INVENTION

The invention pertains generally to device configuration. More specifically, the invention relates to configuring devices having hidden or otherwise protected configuration settings.

Hotel media systems often integrate equipment from different vendors such as televisions (TVs) from one vendor, set-top boxes (STBs) from another vendor, etc. Different models and versions of equipment from the same vendor may also be present. Most of this equipment needs to be configured before it will integrate with the hotel's media system. For example, an installer may need to manually configure each television to utilize a communication protocol supported by an attached STB. Likewise, each STB may need to be configured with information allowing it to communicate with a central controller. Without the proper settings, the various pieces of equipment may be unable to inter-communicate, or may be able to inter-communicate partially but errors will occur or other performance problems will be encountered. Additionally, devices may require reconfiguration after the initial installation. For example, an upgrade to a STB may require certain settings be changed on an attached TV in order to maintain compatibility, or power surges and static discharge may erase or corrupt settings and require reconfiguration of settings. A configuration mechanism in each device needs to allow configuration changes to be made by administrative and support staff; however, guests staying in the hotel must be prevented from making changes to the configuration settings of devices to avoid "breaking" the system.

In a typical consumer electronic device such as a home TV, device configuration typically takes place in a setup menu accessible from a MENU button on a remote control or front panel of the device. In this setup menu, a home user can manually set or change all settings of the device. Because configuration of media devices in a hotel media system needs to be secured from guest tampering, having such a visible and easily accessible configuration menu is not desirable for equipment utilized in a hotel system. Some devices may include a function to password protect the configuration menu; however, passwords are often forgotten and hard to manage with different staff members and vendors so this solution is rarely used in the hospitality industry.

Makers of hospitality-grade electronic devices have solved the staff-only configuration problem by introducing what are commonly known as "hidden" service-configuration menus on each piece of equipment. These hidden service-configuration menus, also known as service menus, factory menus, secret setup menus, etc., are not indicated on the device's user interface and are only accessible through a predetermined (but otherwise meaningless) sequence of commands entered via the remote control. After a certain seemingly random sequence of button presses on a remote control, an installer or administrator is able to access a hidden setup menu. The hidden menu may include one or more low-level configuration settings such as communication protocols, modes, feature set enabling/disabling, maximum volume settings, authorized channel sets, etc.

For example, entering a hidden service-configuration menu on a particular TV may involve a sequence of commands such as:
1. Hold down MENU
2. Press 9
3. Press 8
4. Press INFO
5. Press EXIT As the above command sequence will not normally be known to a guest and is highly unlikely to be encountered in normal operation, guests are generally prevented from entering the hidden service-configuration menu on the TV. If a guest reports that a particular device such as the TV is having a problem, an administrator goes into the room to use the remote in order to press the special sequence of buttons to enter the hidden service-configuration menu and check to see that the configuration settings are correct. In this way, the predetermined command sequences operate similar to passwords and are known only to service personnel and staff who may need to check configuration settings.

The particular command sequence to enter the service menu for a particular model of a device is usually published in a service manual for that device. Because service manuals tend to get lost or misplaced, such information is also commonly available online at manufacturers' web sites. Performing an Internet search for the brand, model number, and the phrase "service menu" often results in the predetermined sequence of key presses on the remote required to enter the hidden service-configuration menu for any given device. In this way, a determined guest may still find a way to enter the service menu.

To further increase security and prevent the above problem, some manufactures offer two remote controls: one for guest usage, and one for staff usage. Performing the proper sequence of commands on the staff-remote will enter the hidden service-configuration menu of the device, while performing the same sequence on the guest-remote will not. The staff-remote may also require a predetermined command sequence (and possibly the switching of the remote into a staff-remote mode via a physical switch on the remote) to enter the hidden service-configuration menu so that the staff-remote could be utilized by a guest in an emergency (e.g., the guest's remote is broken). If the staff-remote is only ever going to be used by support staff, the staff-remote may be used as an administrator interface of the device and include a special button to directly enter the hidden service-configuration menu. This special button is not present on the guest-remote and is not available via the user interface of the device. Because only the staff-remote can enter the service menu, the staff-remote is generally only used to setup the device during installation and is thereafter kept at the front desk or with support personnel in case reconfiguration is required. The guest-remote is placed in the hotel room for guest usage. In this way, guests are prevented from entering the hidden service-configuration menu using the guest-remote even if they know the predetermined command sequence.

As each of the above solutions may be used by different vendors, installers and administrators of large hotels or other hospitality establishments having a variety of types and models of media equipment must carry with them numerous remotes and remember the sequences of button presses utilized to access the secret service menus for several different devices. This creates a logistical problem of tracking and maintaining the important but rarely used set of staff-remotes and keeping track of which command sequences are required to enter the hidden service-configuration menu for each device in each room. In a worse-case support call, if the required staff-remote or command sequence is lost or unavailable for some reason (i.e., staff-remote is broken and/or command sequence is incorrect), administrators may be unable to solve a guest's problem with a particular device.

BRIEF SUMMARY OF THE INVENTION

According to an exemplary embodiment of the invention there is disclosed a configuration apparatus. A user interface allows a user to initiate configuration of a target configurable device selected from a plurality of configurable devices of a media system. A command module dynamically generates a sequence of commands to enter a hidden service-configuration menu of the target configurable device and to change settings within the hidden service-configuration menu in order to configure the target configurable device to operate in a manner compatible with the media system. A communication module transmits the sequence of commands to the target configurable device. A user interface of the target configurable device does not indicate a way to enter the hidden service-configuration menu.

According to another exemplary embodiment of the invention there is disclosed a method including allowing a user to initiate configuration of a target configurable device selected from a plurality of configurable devices of a media system. The method further includes dynamically generating a sequence of commands for entering a hidden service-configuration menu of the target configurable device and changing settings within the hidden service-configuration menu in order to configure the target configurable device to operate in a manner compatible with the media system. The method further includes transmitting the sequence of commands to the target configurable device. A user interface of the target configurable device does not indicate a way to enter the hidden service-configuration menu.

According to yet another exemplary embodiment of the invention there is disclosed a method including allowing a user to initiate configuration of a target configurable device selected from a plurality of configurable devices of a media system. The method further includes automatically determining another device of the media system that is coupled to the target configurable device, and dynamically generating a sequence of commands for entering a hidden service-configuration menu of the target configurable device and changing settings within the hidden service-configuration menu in order to configure the target configurable device to operate in a manner that is compatible with the other device. The method further includes transmitting the sequence of commands to the target configurable device. A user interface of the target configurable device does not indicate a way to enter the hidden service-configuration menu. The media system is installed at a hospitality establishment and the target configurable device is a guest-facing audio/visual (AV) entertainment device.

According to yet another exemplary embodiment of the invention there is disclosed a hospitality media system including a media system controller coupled to a computer network. The media system controller includes a storage device storing therein a configuration database of information pertaining to a plurality of configurable devices installed throughout a plurality of guest rooms of a hospitality establishment. The system further includes a portable configuration device including a network interface, a transmitter, a user interface, and one or more processors. By the one or more processors of the portable configuration device executing a software application program, the one or more processors are operable to access the information of the configuration database via the computer network and allow a user of the portable configuration device to interact with the user interface in order to select a particular guest room of the hospitality establishment. The particular guest room is one of the plurality of guest rooms of the hospitality establishment. The one or more processors are further operable to generate a list of configuration devices installed in the particular guest room according to the information of the configuration database, and display the list on the user interface of the portable configuration device and allow the user to interact with the user interface in order to select a target configurable device from the list. The one or more processors are further operable to generate a sequence of commands to enter a hidden service-configuration menu of the target configurable device according to the information of the configuration database, and transmit the sequence of commands to the target configurable device utilizing the transmitter.

According to yet another exemplary embodiment of the invention there is disclosed a method including accessing information of a configuration database by a portable configuration device via a computer network. The configuration database is stored at a system controller coupled to the computer network and the information pertains to a plurality of configurable devices installed throughout a plurality of guest rooms of a hospitality establishment. The method further includes allowing a user of the portable configuration device to interact with a user interface of the portable configuration device in order to select a particular guest room of the hospitality establishment. The particular guest room being one of the plurality of guest rooms of the hospitality establishment. The method further includes generating a list of configuration devices installed in the particular guest room by the portable configuration device according to the information of the configuration database, and displaying on the user interface of the portable configuration device the list and allowing the user to interact with the user interface in order to select a target configurable device from the list. The method further includes generating a sequence of commands to enter a hidden service-configuration menu of the target configurable device according to the information of the configuration database, and transmitting the sequence of commands from the portable configuration device to the target configurable device utilizing the transmitter.

These and other embodiments and advantages of the embodiments of the present invention will become apparent from the following detailed description, taken in conjunction with the accompanying drawings, illustrating by way of example principles of the invention.

BRIEF DESCRIPTION OF THE DRAWINGS

FIG. 4 shows an exemplary command sequence table that may be included in either or both the central/local databases of FIG. 1 and that operates in conjunction with the device table shown in FIG. 3.

DETAILED DESCRIPTION

Figure 1:
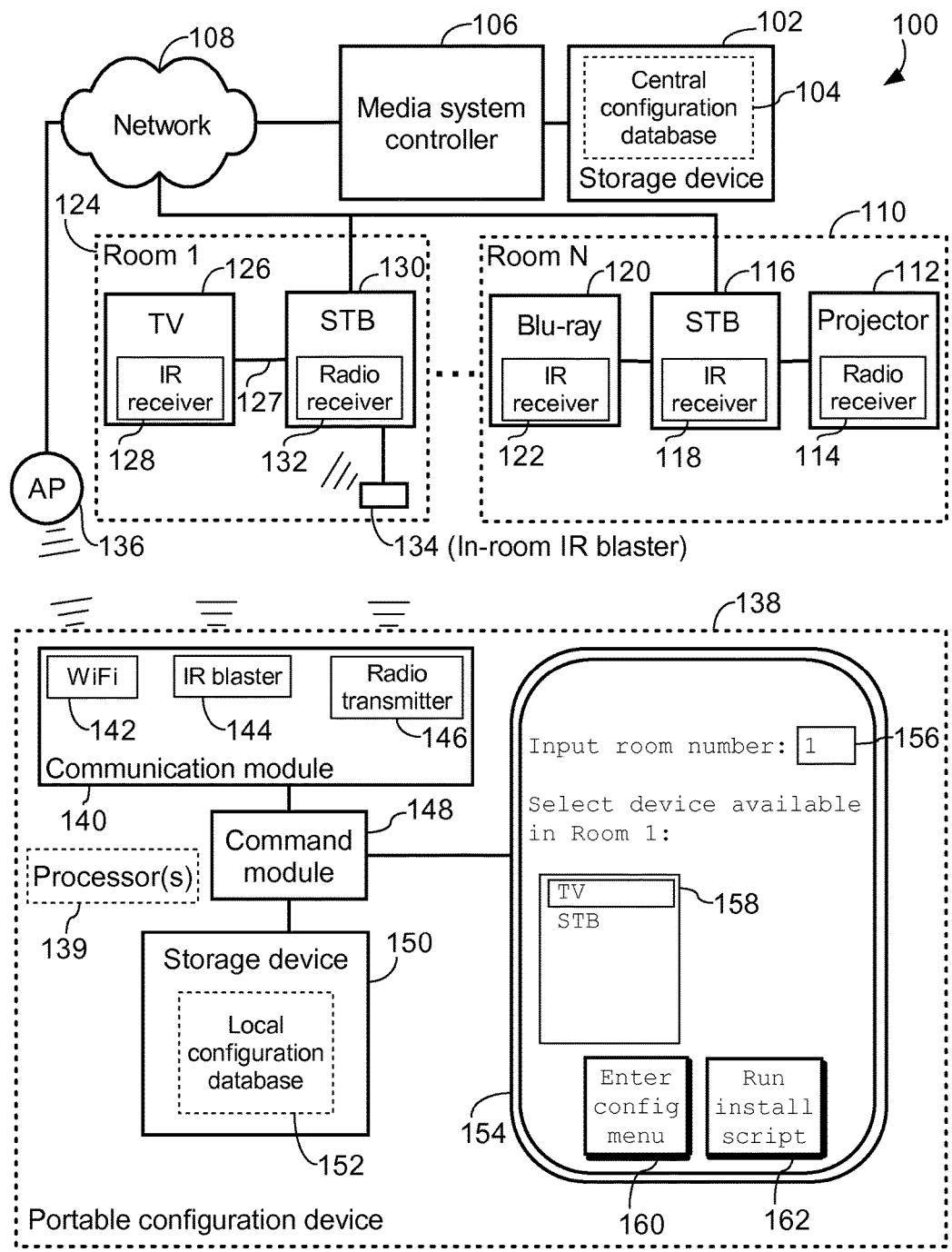
FIG. 1 shows a hotel media system having devices configured by a portable configuration device according to an exemplary configuration of the present invention.

FIG. 1 shows a hotel media system 100 having devices 112, 116, 120, 126, 130 configured by a portable configuration device 138 according to an exemplary configuration of the present invention. In this example, the configuration device 138 is a portable electronic device carried by staff that can configure any guest-facing interactive device 112, 116, 120, 126, 130 in the hotel's media system 100. The configuration device 138 works either in a stand-alone mode or in conjunction with the media system 100 to allow staff to easily configure and test devices in the media system 100 such as audio/visual entertainment devices 112, 116, 120, 126, 130. One aspect of the invention is that the configuration device 138 automatically sends the correct sequence of configuration commands to each device 112, 116, 120, 126, 130 in order to enter its hidden service-configuration menu without staff having to keep track of multiple staff-remotes and versions of in-room equipment, and without staff remembering any special key sequences to enter hidden menus on the different types, brands, and model numbers of devices 112, 116, 120, 126, 130 in the various rooms 110, 124.

As shown in the exemplary configuration of FIG. 1, the hotel media system 100 includes a media system controller 106 providing media content and control functions to guest-facing interactive devices 112, 116, 120, 126, 130 located in a plurality of hotel rooms 124, 110. In this example, devices 112, 116, 120, 126, 130 are audio/visual (AV) entertainment devices located in a plurality of hotel rooms 124, 110 and include a television 126; set-top boxes (STBs) 130, 116; a Blu-ray optical disc player 122; and a projector 112. Each of the devices 112, 116, 120, 126, 130 is interactively controlled by users during normal operations using either an infrared remote control device or a radio-signal based remote control device. For example, infrared receivers 128, 122, 118 are respectively installed in TV 126, Blu-ray player 120, and STB 116; and radio receivers 132, 114 are respectively installed in STB 130 and projector 112. Each device 112, 116, 120, 126, 130 is also configurable by staff and includes a hidden service-configuration menu for this purpose.

As determined by the device manufacturer, the hidden service-configuration menu on each particular device 112, 116, 120, 126, 130 may be protected using any one of the commonly utilized techniques describe above in the background section, including entering a predetermined sequence of commands on the remote control device, putting the remote control in a staff-only mode to send special commands, utilizing a manufacturer-provided staff-only administrator interface enabled remote that sends special commands, entering a password to gain entry to the service menu or specific configuration setting, etc. The techniques of the present invention may be adapted to allow configuration of a configurable device having any kind of hidden or otherwise protected configuration menu. The hidden service-configuration menu may also include or correspond to a single hidden configuration setting. It is not required that all devices 112, 116, 120, 126, 130 have the same method of protecting the service menu. In general, the user interface of each guest-facing interactive device 112, 116, 120, 126, 130 will hide the existence of the hidden service-configuration menu by not indicating any way for users to enter this hidden menu. For example, no buttons on the guest remote or menu selections on on-screen menus will be indicated for entering the hidden menu. In this way, regular users will not know how to enter the hidden service menu and will therefore be unable to "break" the configuration of the device 112, 116, 120, 126, 130 by changing settings available only in the hidden menu.

A storage device 102 is coupled to the media system controller 106 and may include a central device/location configuration database 104 storing information relating to each of the configurable devices 112, 116, 120, 126, 130 in the rooms 124, 110. In this example, the configuration device 138 includes a communication module 140, a command module 148, a storage module 150, and a user interface 154. The storage device 150 may include a local device/location configuration database storing information relating to each of the configurable devices 126, 130, 116, 112 in the rooms 124, 110. Although, the command module 148 is shown in FIG. 1 as a dedicated hardware module, the command module 148 may also be implemented in other configurations as a software program that is executed by a general or specific purpose processor 139 and that causes the processor 139 to operate pursuant to the software program to perform the functions of the command module 148 described below.

In this example, the user interface 154 of the configuration device 138 is a touch-screen allowing a user of the configuration device 138 to specify a hotel room number at input field 156 and then to select one of the configurable devices 112, 116, 120, 126, 130 available in that room. Although the user interface 154 is implemented as a touch screen in this example, other types of user interfaces 154 may also be utilized. As shown in FIG. 1, the user has specified the first room 124 as a target location and is thereafter able to select between TV 126 and STB 130, which are the two configurable devices 126, 130 available in the first room 124.

In this example, the user has selected the TV 126 as the target configurable device using list 158, and, after selecting the target configurable device 126, the user may initiate configuration of the TV 126 by pressing either of buttons 160, 162. The first button 160 causes the command sequence specific to the exact brand and model number of TV 126 to be sent from the communication module 140 to the TV 126 to display via the TV's user interface its hidden service-configuration menu. The second button 162 causes a full configuration command sequence to be sent to the TV 126 for full configuration (or reconfiguration) according to an installation script. The installation script first involves sending the above-mentioned commands for entering the hidden service-configuration menu on the target configurable device 126, and then sending additional commands for configuring all items within the hidden service-configuration menu as required to allow the particular target configurable device to be compatible with the media system 100.

The installation script may be dynamic in that the command module 148 automatically takes into account any particular device(s) to which the target configurable device needs to be integrated with when determining the command sequence to send to the target configurable device. For example, the installation script for TV 126 may cause the command module 148 to generate a sequence of commands to configure the communications protocol required to allow TV 126 to communicate with the particular brand and model number of STB 130 because this is the STB that is required for controlling TV 126 in the first room 124. The installation script may be dynamic in other ways such as relating to the particular location of the target device. For example, an Nth room 110 may be a penthouse location having access to additional content channels that are automatically preprogrammed into the STB 116 in that room by the configuration device 138 using the install script. The specific sequence of commands required to enter the hidden service-configuration menu and to perform the install script for each device 112, 116, 120, 126, 130 may be unique to each device 126, 130, 116, 112 and be included in either the local device configuration database 152 or the central device configuration database 104. The sequence of commands may also include additional commands required to enter the hidden service-configuration menu and configure the target device including navigation commands such as "UP", "DOWN", "LEFT", "RIGHT" as required for a particular menu; passwords that may be required to enter protected areas, special codes or signals that may only be present on a staff-remote, etc.

The command sequence(s) sent to each of the target configurable devices 112, 116, 120, 126, 130 from the configuration device 138 may be transmitted using a variety of methods. FIG. 1 illustrates three exemplary transmitters being included in the configuration device 138 such as WiFi 142, IR blaster 144, and radio transmitter 140; however other types of transmitters such as Bluetooth support or ZigBee wireless support may also be added so that any target device using other protocols could be automatically configured as well. In one configuration, the communication module 140 transmits the command sequence determined by the command module 148 to the target device according to the type of receiver specified for the target device in either the central or local databases 104, 152.

In the event the communication module 140 does not include the required transmitter type, the sequence of configuration commands may be transmitted to the target configurable device utilizing an external controller such as STB 130 or media system controller 106. For example, assuming the target configurable device is TV 126 but the IR blaster 144 is not present in the configuration device 138, the communication module 140 may transmit the command sequence to STB 130 using the radio transmitter 134, and STB 130 may pass the commands directly to TV 126 using communication link 127 or utilize in-room IR blaster 134 to transmit the commands to TV 126 using infrared signals when link 127 is not available. In this way, a configuration device 138 without an IR blaster 144 may still perform the initial installation (or configuration, reconfiguration, debug, testing, etc) of TV 126.

This same functionality of transmitting commands utilizing an external controller may be useful when the configuration device 138 is out of range of the target configurable device such as when a support technician in a hotel is unable to enter a guest's room because the guest has placed a do-not-disturb sign on the door. Taking the same example of the target configurable device being TV 126, while the configuration device 138 is not inside the guest's room 124, the communication module 140 may transmit the command sequence from WiFi 142 to the media system controller 106 via AP 136 and network 108. The media system controller 106 then passes the command sequence to STB 134, which either passes the commands to TV 126 directly using link 127 or the in-room IR blaster 134. In this way, an out-of-range configuration device 138 may still perform the initial installation (or configuration, reconfiguration, debug, testing, etc) of TV 126.

Figure 2:
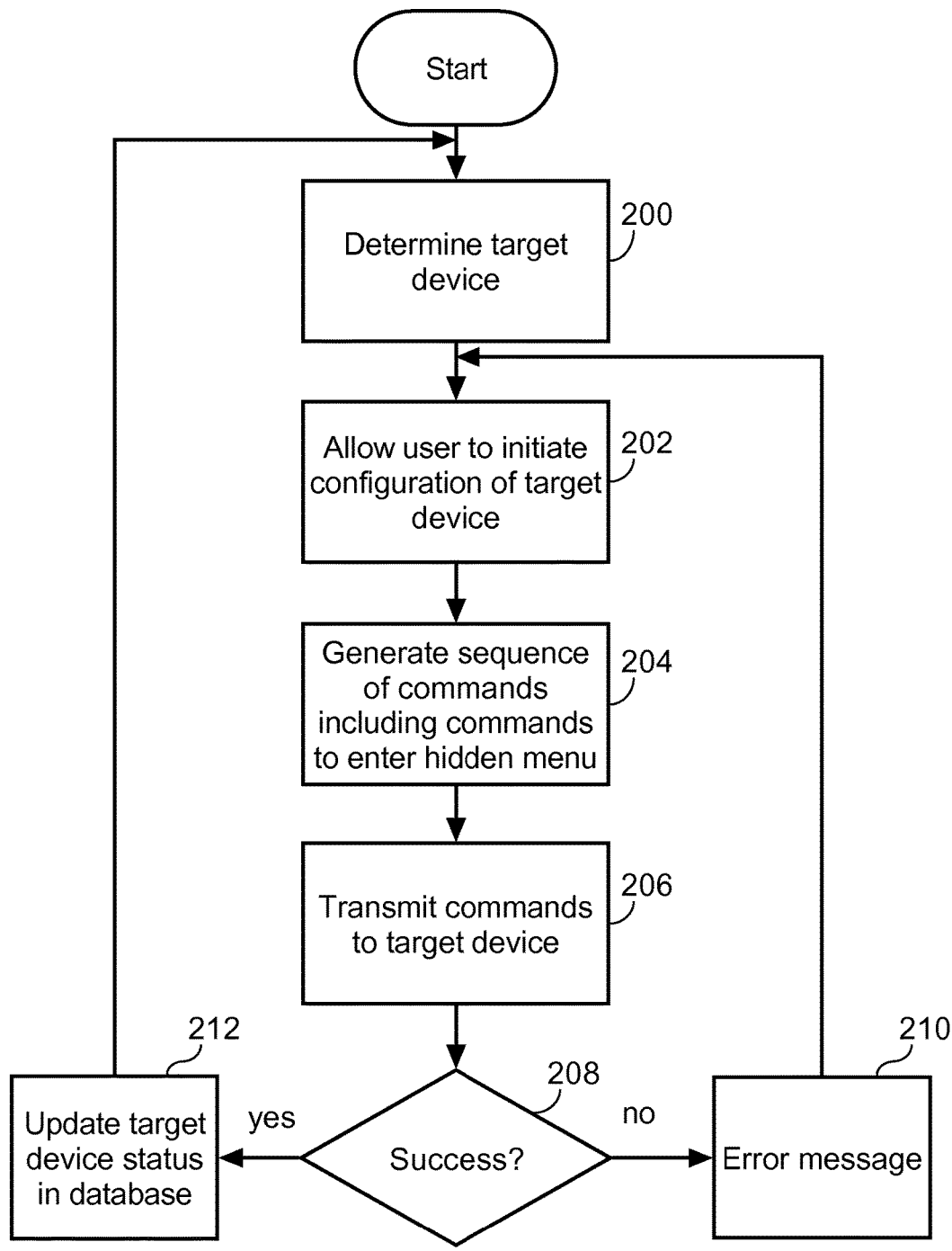
FIG. 2 shows a flowchart describing steps for configuring guest-facing interactive devices using the configuration device of FIG. 1 according to an exemplary configuration of the present invention.

FIG. 2 shows a flowchart describing steps for configuring guest-facing interactive devices 112, 116, 120, 126, 130 according to an exemplary configuration of the present invention. The steps of the flowchart of FIG. 2 are not restricted to the exact order shown, and, in other configurations, shown steps may be omitted or other intermediate steps added. In this example, the configuration device 138 performs the following steps:

Step 200: A target configurable device is determined by the configuration device 138. As shown in FIG. 1, this could be done manually by a user specifying a room number at field 156 of the user interface 154 and then selecting one or more of the target devices 112, 116, 120, 126, 130 available at that location. In another example, the user may select a particular device type, brand, and model number. Alternatively, as will be explained later in this disclosure, the determination of the target device may be done automatically by the configuration device 138 according to configuration state or other information located in either the central or local databases 104, 152.

Step 202: Once the target device is selected, the configuration device 138 optionally guides the user to the target device (if required such as when the target device is automatically determined) and then allows the user to initiate configuration of the target device when ready. For example, the initiation could be performed by a user pressing one of buttons 160, 162 on the user interface 154 of the configuration device 138. If using infrared signals to transmit the command sequence to the target configurable device, before initiating the configuration, the user may need to be guided by the configuration device 138 to orientate the configuration device 138 such that the IR blaster 144 is directed at the IR receiver of the target device or an external controller. Likewise, if using radio signals (including WiFi) the portable configuration device may need to guide the user to locate the configuration device 138 within communication range of the target device or an external controller.

Step 204: The command module 148 automatically determines a sequence of commands required to configure the target device. The sequence of commands at least includes commands required to enter a hidden service-configuration menu on the target device (i.e., when the user presses button 160 in FIG. 1), and may further include additional commands to automatically configure some or all of the of the configuration options presented in the hidden service-configuration menu (i.e., when the user presses button 162 in FIG. 1). A sequence of commands required to configure each configurable device 112, 116, 120, 126, 130 may be stored in the central or local databases 104, 152. The sequence of commands may be dynamic and include variables and conditions so that it may be automatically adjusted by the command module 148 in order to take into account factors that may change such as the location of the target device and which other equipment is operating in conjunction with the target device.

Step 206: The communication module 140 transmits the sequence of commands determined by the command module 148 during step 204 to the target device utilizing the one of the interface modules 142, 144, 146. For example, if the target device has an IR receiver 128, 122, 118 for receiving commands, the communication module 140 may transmit the sequence of commands utilizing the IR transmitter 144. Likewise, if the target device has a radio receiver 132, 114 for receiving commands, the communication module 140 may transmit the sequence of commands utilizing the radio transmitter 140. In another configuration, the communication module 140 may transmit the commands to the target configurable device via an external controller such as the media system controller 106 or one of the in-room STBs 130, 116. For example, assuming that the configuration device 138 does not include the IR transmitter 144 but needs to configure the TV 126, the communication module 140 may utilize the WiFi 142 module to communicate to the media system control 106 via hotel network 108. The media system controller 106 then forwards the command sequence to STB 130, which utilizes the in-room IR blaster 134 to transmit the command sequence to TV 126. In another example, the communication module 140 may utilize the radio transmitter 140 to transmit the command sequence to STB 130, which utilizes the in-room IR blaster 134 to transmit the command sequence to TV 126. The exact interface module 142, 144, 146 utilized to transmit the commands may be specified in either of the databases 104, 152, or may be manually selected by the user in real-time.

Step 208: Either an automatic or manual detection of whether or not the target configurable device was successfully configured may be performed by the command module 148 at this step. Automatic detection may be performed directly by the command module 148 communicating with the target device, if possible. However, usually this will not be possible because there may only be 1-way communication from the communication module 140 to the target device (e.g., infrared signals sent to target device only). In this situation, automatic configuration may be performed by communication with a controller such as the media system controller 106 or the STBs 130, 116.

For example, suppose the target device is STB 130 being configured by media system 100 vendor staff during initial hotel installation. Configuring the STB 130 may involve setting an IP address or host name for the STB 130 to use on the network 108 and/or setting the STB 130 to use a control protocol compatible with TV 126. Before the STB 130 is successfully configured, the media system controller 106 will be unable to communicate with STB 130, and after STB 130 is successfully configured, the media system controller 106 will be able to communicate with and control the STB 130. In this way, the media system controller 106 is capable of confirming the successful configuration of STB 130. To take advantage of this, the command module 148 may communicate with the media system controller 106 via the WiFi module 142 and the network 108 in order to confirm that STB 130 was successfully configured. In another configuration, the media system controller 106 may automatically check for successful configuration of STB 130 and update the central device database 104 to indicate the new configuration status of STB 130. The command module 148 thereafter confirms STB 130 was successfully configured by checking the central database 104.

In yet another configuration, manual detection may be performed by querying the user. This may be useful in the event that automatic detection is not possible. For example, when configuring a target configurable device that is not connected to any controller 106, 130, 116, it may be required to query a user of the configuration device 138 to manually confirm that the target device was successfully configured. For example, after setting up TV 126, the TV 126 should be able to display television content. The configuration device 138 may therefore query the user as to whether or not the user can watch television on TV 126 in order to determine whether or not TV 126 was successfully configured. If the target device was successfully configured, control proceeds to step 212; otherwise, control proceeds to step 210.

Step 210: In the event that the target device was not successfully configured after a predetermined number of retries, an error message may be displayed with troubleshooting suggestions. When the user is ready to retry configuration of the target device, control returns to step 202.

Step 212: After confirming that the target device was successfully configured, if not already done by another controller (such as during step 208), the command module 148 may update the configuration state of the target device in the local and/or central device and room databases 104, 152. Control then returns to step 200 to choose a next target configurable device.

Figure 3:
FIG. 3 shows an exemplary device table that may be included in either or both the central/local databases of FIG. 1.

FIG. 3 shows an exemplary device table 300 that may be included in either the central device database 104 and/or the local device database 152. For each location in the hotel, the available entertainment devices, their model numbers, and their configuration statuses are included in table 300. FIG. 4 shows an exemplary command sequence table 400 that may be included in either or both of the databases 104, 152 and that operates in conjunction with the device table 300 shown in FIG. 3. The command sequence table 400 stores the interface type, code set, hidden service-configuration menu command sequence, and additional install script for each model number of the various configurable devices 112, 116, 120, 126, 130 in the media system 100. It should also be noted that the database structure shown in exemplary tables 300, 400 is not meant to be limiting. For example, the structure illustrated herein was chosen to reduce redundant information stored in the databases 104, 152; however, it is not necessary to separate each database 104, 152 into two tables. In other configurations, one or more tables may be utilized including the same, fewer, or more fields than illustrated herein according to other design requirements.

In a stand-alone configuration, only the configuration device 138 stores the local configuration database 152 and there is no central configuration database 104. This configuration may be useful for a single, fixed-usage configuration device 138 that operates on its own without interaction with other configuration devices 138 or a central controller 106. The local database 152 may be setup and maintained by a vendor of the media system 100 or directly by the user of the configuration device 138, for example.

In another example, the central media system controller 106 may store a master copy of the database 104, which is downloaded to the storage device 150 of the configuration device 138 prior to use. This configuration may be useful when the portable configuration device also serves other purposes and may not have the most up-to-date version of the central database 104 due to being utilized for other purposes for a period of time. For example, a general purpose portable computer, mobile phone, or other electronic device may operate in one mode as the configuration device 138. Upon switching to this mode, the configuration device 138 may download the up-to-date central configuration database 104 and cache a local copy 152. The download may take place over network 108 using WiFi 142 or another type of available network module such as a local area network (LAN) Ethernet technology or wide area network (WAN) 3G technology.

A benefit of this configuration is that any portable device may become the configuration device 138 by simply executing an application program to perform the steps of FIG. 2 and caching in its storage device 150 a local copy of the central device database 104.

Yet another benefit of this configuration is that a same configuration device 138 may be utilized at different hospitality properties and with new models of entertainment devices by simply downloading and caching in its storage device 150 a new local copy 152 of the central configuration database 104. If the configuration status of any device changes in the local device database 152, the changes may be sent back to the media system controller 106 for permanent storage in the central device database 104.

In another configuration, only the central device database 104 may be utilized with no local device database 152. In this example, the command module 148 in the configuration device 138 accesses the central database 104 remotely via the WiFi module 142, AP 136, and network 108. This configuration may be useful when several portable configuration devices 138 are utilized simultaneously. During installation of a large media system 100 having thousands of pieces of equipment that need to be configured, several installers may be configuring equipment at the same time. Because table 300 indicates which devices have been configured already and which have not, the configuration device 138 may automatically guide the installers to non-configured equipment. Each time a device at a particular location is configured, the "configured" column of table 300 for that device in the central database 104 may be updated to reflect the configured status. Because all the configuration devices 138 utilize the same central database 104, duplicate configuration of an already-configured device is avoided. Combinations of the above examples may also be utilized.

Figure 5:
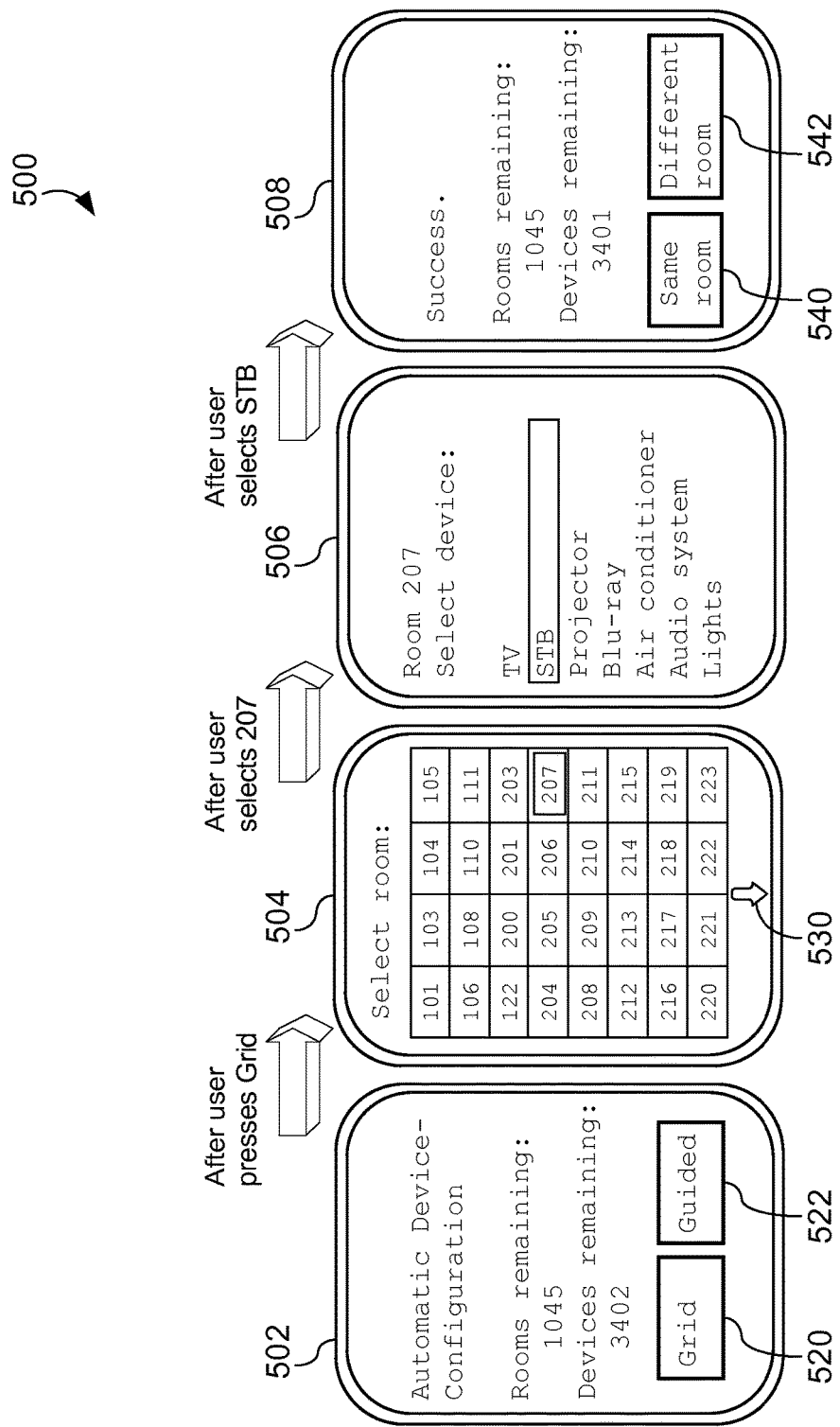
FIG. 5 illustrates a sequence of screens on the user interface of the configuration device of FIG. 1 when performing automatic device configuration in one example of the present invention.

FIG. 5 illustrates a sequence of screens 500 on the user interface 154 of the configuration device 138 when performing automatic device configuration in one example of the present invention. Automatic device configuration may be utilized during installation, upgrade, or reconfiguration of the media system 100, for example. A first screen 502 indicates the number of locations (e.g., hotel rooms in this example) having at least one non-configured device and the total number of devices that need to be configured according to the information stored in table 300. Two buttons 520, 522 are presented to the user to select between a "Grid" mode and a "Guided" mode. After the user presses the grid button 520, a second screen 504 is presented showing a grid of hotel rooms that have at least one device that needs to be configured. An arrow 530 allows the user to scroll down in the list if there is not enough space on the user interface 154 to display all rooms.

In this example, the user selects room 207 and is presented with a third screen 506 showing all the devices that need to be configured in room 207. The user initiates configuration of the STB in room 207 on screen 506, and the command module 148 automatically determines the sequence of commands required to configure the STB in room 207 by first checking table 300 to determine the STB module number and then checking table 400 to determine the hidden service-configuration menu command sequence and the additional install setup script for the STB module number. For example, if table 300 indicated a STB having module number "4" in room 207, the command module 148 determines the hidden service-configuration menu command sequence as "MENU, 8, 2, Up, Up, 2, 3, 5". Next the command module 148 determines the sequence of commands to perform the additional install script specified for the target STB in table 400, including:

1. Set room number
2. Set controller IP address
3. Set peripheral communication type(s)

The install script is dynamically converted to a sequence of commands according to the particular room number of the target STB (i.e., room 207), the media system controller's 106 IP address, and the communication types required to be configured in the target STB in order to allow the STB to control the other peripheral devices in the room such as the list of devices shown in screen 506. In this example, the room number, controller IP address, and peripheral communication types are script variables that are adjusted by the command module, for example, according to the details of other in-room equipment as specified in tables 300 and 400. Another table or fields (not shown) may be stored in the database(s) 104, 152 to specify any additional information that is required to generate the sequence of commands for the install script as required in particular implementations. For example, the command sequence may involve additional commands for navigating through the hidden service-configuration menu on the target device, making changes as appropriate, and saving the configuration. Once the entire command sequence is determined by the command module 148, the commands are then sent to the target STB by the communication module 140 via the IR blaster 144 because this is the interface specified for the target STB in table 400. Additionally, the code set specified in table 400 allows the IR blaster 144 to know what infrared codes are required by the target STB to represent the various commands such as "MENU", "8", "2", "Up", "Down", "Save", etc.

After transmitting the sequence of commands to the target STB, the command module 148 then communicates with the media system controller 106 via AP 136 and network 108 in order to determine if the command sequence was successful in configuring the target STB. Assuming that the media system controller 106 can now communicate with the target STB and check all the configuration settings as correct, the configuration status of the target STB is updated to "configured" in table 300 and screen 508 is displayed indicating success to the user and updating the overall remaining rooms and devices still requiring configuration.

The user may continue to configure other devices in the same room by pressing button 540 or may select a different room by pressing button 542. It should also be noted that at screen 506 the user may also select multiple devices to be configured at the same time. In this configuration, the command module 148 repeats the various above steps for each of the selected devices and the fourth screen 508 may indicate which devices were configured successfully and which need to be retried. Instructions such as pointing the IR blaster 144 in the direction of the target devices that were not configured may be provided.

Figure 6:
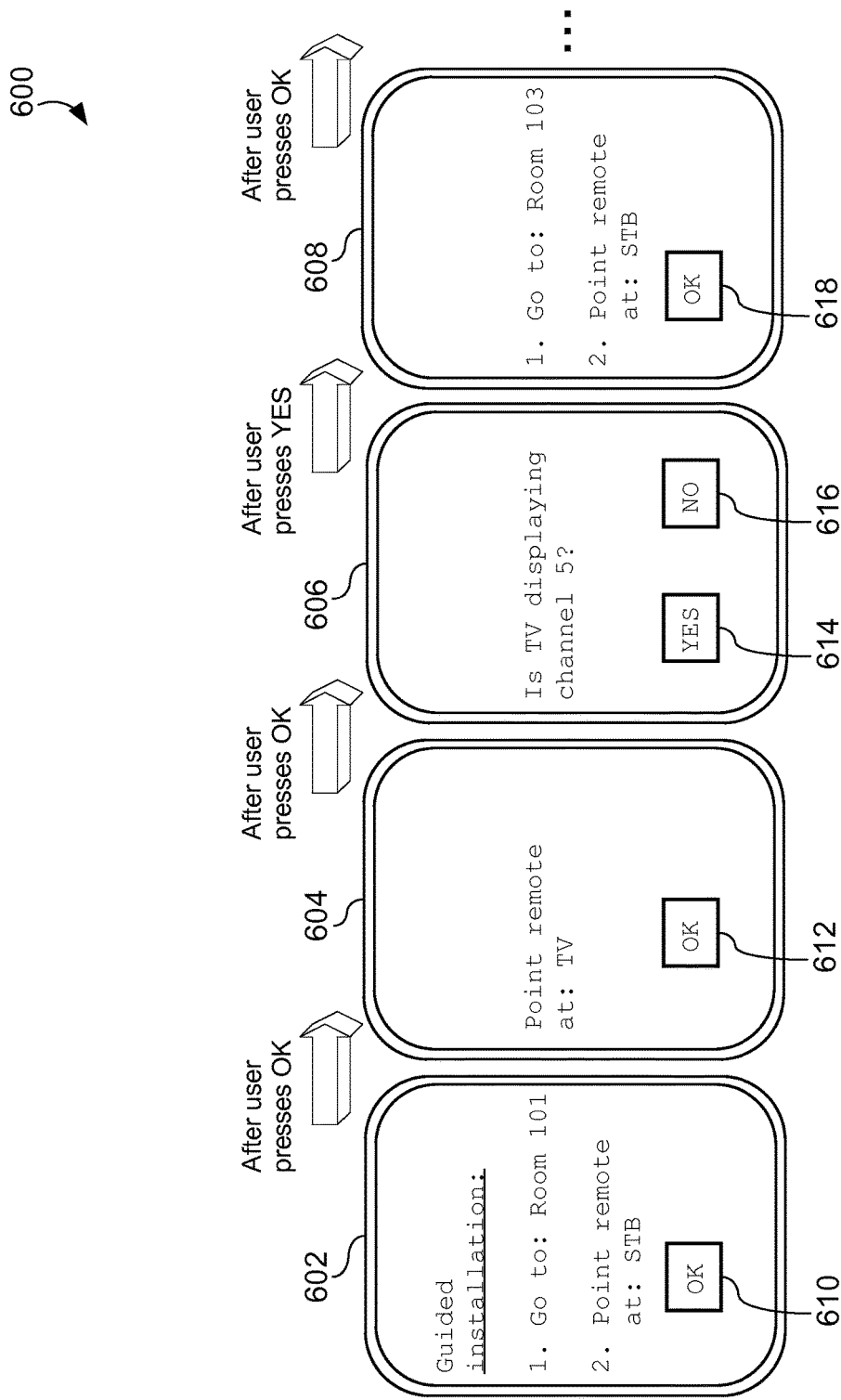
FIG. 6 illustrates a sequence of screens on the user interface of the configuration device of FIG. 1 when performing automatic device configuration in another example of the present invention.

FIG. 6 illustrates a sequence of screens 600 on the user interface 154 of the configuration device 138 when performing automatic device configuration in another example of the present invention. The first screen 600 may be the result of a user pressing the "Guided" button 522 of FIG. 5 and includes instructions for a user to go to a particular location and then to point the configuration device 138 (referred to as a "remote" in screen 602) at a particular target device.

In this example, the location is "Room 101" and the target device is the STB in Room 101. When ready, the user initiates configuration of the STB in Room 101 by pressing the OK button 610. The command module 148 then determines the sequence of commands required to configure the target STB and confirm success using a process similar to that described for FIG. 5. Again, the sequence of commands includes the commands required to enter the hidden service-configuration menu and to navigate throughout the hidden menu and make the required configuration changes specific for the target STB.

Assuming success is confirmed (via the media system controller 106 as described above, for example), screen 604 is displayed guiding the user to point the configuration device 138 at the next target device being the TV. The user initiates configuration of the TV by pressing button 612 and the command module determines the sequence of commands required to configure the target TV using a process similar to that described for FIG. 5.

In this example it is assumed that the media system controller 106 and the STB in Room 101 are unable to automatically determine whether the configuration of the target TV was successful so a manual confirmation is required from the user in screen 606. The manual confirmation may be facilitated by having a last step of the install script being to set the TV to display a particular channel and then having the user confirm they can see the content displayed on that channel (e.g., an interactive program guide of content available on the TV). If the user is unable to view the specified channel, the user may press button 616 in order to retry the configuration. Alternatively, the user may press button 614 to confirm success and screen 608 is shown guiding the user to a next target device in a next room because all devices in the current room are now configured. Again, screen 604 may be omitted if the both the STB and the TV are configured at the same time.

Automatic installation as illustrated in the examples of FIG. 5 and FIG. 6 allows installers and support staff to quickly and easily configure devices in the hotel media system 100 without having to carry many remotes or remember any configuration details such as secret command sequences to enter hidden service-configuration menus on different devices. Additionally, if the installer skips a room or misses a device for some reason, the configuration device 138 working with either (or both) of the databases 152, 104 keeps track of the devices/rooms so that they could be configured later.

In another configuration, a map or list of the various rooms in the hotel is shown on the configuration device 138 with rooms requiring configuration shown in red and rooms that are fully configured shown in green, for example. The installer takes the configuration device 138 to any room in red and then selects that room (e.g., on a touch screen 154). The configuration device 138 then sends the appropriate IR/radio commands to configure all the devices in the room. Once confirming that all configurations were successful, the room becomes green on the map/list. If multiple configuration devices 138 are being used by several installers at the same time, the map or list of rooms needing to be configured may be updated in real time via AP 138 and network 108 in the hotel so all installers have an accurate picture of which rooms still need to be configured.

Many other implementations of guided and automatic device configuration are also possible with a goal that the configuration device(s) 138 handle most (all) of the technical configuration aspects of the complicated remote key presses to access hidden service-configuration menus and make configuration changes according to what settings need to be configured, and to keep track of the statuses of all devices in all rooms. The sequence of commands and various configuration tasks may all be pre-programmed in advance or dynamically determined on the fly according to information in the databases 104, 152, and the installers simply need to take their configuration device 138 to one or more rooms for automatic configuration. This greatly reduces the burden on the human installer and therefore installations are completed much faster with better quality. A similar benefit also applies to reconfigurations, debugging, upgrades, testing, support calls, etc.

In an exemplary configuration of the invention, a universal configuration application executed on a mobile or portable device 138 causes a general-purpose processor 139 of the portable device 138 to act as the command module 148. In this way, any mobile or portable device 138 can not only replace all of the remotes required to configure devices, but can also automatically perform the special key-sequences that are required to access the hidden service-configuration menus and program each entertainment device 112, 116, 120, 126, 130. As each guest room may include different devices such as different TVs that require different key-sequences to enter the configuration menu, this provides support staff an efficient and reliable way of setting up and checking configuration setting of equipment. Additionally, support staff does not need to be burdened with remembering all of the specific access codes and hidden menus for each device.

Another aspect of the invention involves performance testing. In the event of a trouble report, for example that a TV is slow to change channels, an administrator may want to perform performance testing on the device such as cycling through all the channels to see if one takes longer than the others, for example. A button on the configuration device 138 may be pressed to start channel cycling and then the configuration device 138 sends the channel change commands every predetermined number of milliseconds. The delay could be configurable for different tests, but because the channel change interval is fixed during a single test, the administrator may easily see if some channels take longer than others. An in-room STB or other external controller may also monitor the time between changes to get more accurate measurements. A report may then be displayed on the screen showing which channels have delayed changes. One benefit of having the configuration device 138 perform the channel changes automatically rather than a human pressing the channel up button repeatedly is that the human element is removed so the testing is more accurate. Especially when testing hundreds (or thousands) of channels, a human operator may get tired and press the button with inconsistent timings and may not notice when some channels take longer to change then others. Other buttons on the UI 154 may be included for other tests or to reset the target device back to factory defaults.

Another aspect of the invention involves remote operation. The configuration device 138 may configure or operate the devices in the room even when staff is not in the room. One benefit of this configuration is that an administrator may not be able to enter the room in order to change settings because, for example, the room may be occupied by a guest at the time a configuration change needs to be made. When installers don't have physical entry access to a room an in-room IR-blaster 134 may be utilized. In-room IR blaster 134 is installed in the hotel room 124, and configuration device 138 may send commands through the hotel network 108 to the in-room IR blaster 134 to perform any of the above configuration operations. Intermediate devices such as the media system controller 106 and/or the STB 130 may pass the commands along to the appropriate in-room IR blaster 134.

This control method is particularly suitable for mobile devices such as the iPhone® by Apple Incorporated. The current version of the iPhone does not have IR blasting capability built-in so it cannot send IR remote codes directly. Instead, a mobile application having the above described functionality such as that shown in FIG. 2 may be installed and communicate the command sequence from the iPhone to the in-room IR blaster 134 using any available communication path such as wireless AP 136 or 3G. The application may send the desired operation (i.e. enter hidden menu and then program TV channel lineup) to the media system controller 106, which ensures the application is authenticated and then translate the operation to the proper command sequence based on the devices involved (ie. STB with a particular brand of TV) and transmit it to the target device. Other mobile devices capable of running a custom application could also be used as the configuration device 138, including laptops, notebooks, tablet computers, mobile phones, personal digital assistants (PDAs), etc. Because any electronic device with at least one type of communication interface may be utilized as a configuration device 138 according to the present invention, the problem of a broken or missing staff-remotes preventing hotel staff from assisting a guest is also solved.

The ability to configure a STB or TV device remotely raises potential customer service concerns. For example if a guest room were occupied with the guest currently using the media system and suddenly the STB or TV started automatically configuring itself it will raise customer service complaints. This type of issue can be overcome by ensuring disruptive operations are only authorized for the proper user types and can only be performed when the room is in a vacant/checked-out state or the device of the media system 100 in that room are not in use, for example. In other words, the configuration device 138 may allow a user to initiate configuration of a target device only when the user is authorized and when the target device is not in use by a guest. User authentication may also play a role in determining what operations are available. For example, an installer may be able to change television configuration settings using a single button function on a mobile configuration device 138, but a regular hotel staff member would only be able to cause diagnostic information such as version numbers found within the hidden service-configuration menu to be displayed on the television and would not be able to change the settings. The user authentication information may be stored within the storage device 150 of the configuration device 138 or remotely such as in the central database 104 connected to the media system controller 106.

As mentioned, the configuration device 138 may target multiple devices at once, for example "all TVs of a certain make/model", "all TVs on the 9th floor", "all devices in the penthouse", etc. This helps speed up the installation process. Either in-room IR-blaster 134, radio signals, or another remote control method such as passing commands via media system controller 106 may be used. The configuration device 138 may be utilized by an installer when they first install the media system 100. In another configuration, the configuration device 138 may be used by a hotel staff member as part of a troubleshooting process in response to a guest complaint.

In summary, a configuration apparatus includes a user interface allowing a user to initiate configuration of at least a target configurable device selected from a plurality of configurable devices. A command module is coupled to the user interface for dynamically generating a sequence of commands required to configure the target configurable device. The sequence of commands includes commands for entering a hidden service-configuration menu of the target configurable device. A communication module is coupled to the command module for transmitting the sequence of commands to the target configurable device. The commands may be transmitted to the target device via an external controller, and the controller may also confirm whether or not the configuration was successful. A database may be centrally or locally stored mapping each of the configurable devices to a specific script to generate the sequence of commands and storing the configuration status of each configurable device.

The configuration apparatus allows a user to initiate automatic configuration of a target device selected from a plurality of target devices. In response to the user initiating configuration of the selected target device, the configuration apparatus dynamically generates a sequence of commands required to configure the target device and transmits this newly generated sequence of commands to the target device. By the configuration apparatus dynamically generating the sequence of commands required to configure the target device, the user beneficially does not need to be aware of what commands need to be sent to configure the target device, and the user does not need to pre-define or otherwise save the exact sequence of commands as a macro before the configuration apparatus can be used to configure the target device. Additionally, as the sequence of commands includes the correct commands for entering a hidden service-configuration of the target device, users are therefore not required to keep track of or remember different hidden menu access requirements for all the different devices that may need to be configured.

The present invention is particularly beneficial in a hotel environment where equipment such as a newly installed flat screen television or set-top box (STB) typically needs to be configured before it will work in the hotel according to the room number and/or according to other equipment installed in the room or elsewhere in the hotel's media system. Users such as hotel front desk staff and installers may simply carry the configuration apparatus with them throughout the hotel and may initiate and successfully configure any target device in the hotel without knowing any technical details or requirements of the target device and without having to remember how to enter the hidden service-configuration menu for the different target device types that may be used in different rooms.

Although the invention has been described in connection with a preferred embodiment, it should be understood that various modifications, additions and alterations may be made to the invention by one skilled in the art without departing from the spirit and scope of the invention as defined in the appended claims. For example, in another configuration, the command module dynamically generates the sequence of commands required to configure the target configurable device before the user has initiated configuration of the target configurable device such as in response to a change made to equipment in the hotel. For example, at the time an installer installs a new STB in a certain room, the command module may dynamically generate a sequence of commands required to reconfigure the in-room TV and other configurable devices in the room to work with the new STB. In another example, although the steps of FIG. 2 are shown to be performed by the portable configuration device 138 illustrated in FIG. 1, in actual implementations, the components in the media system 100 such as the media system controller 106 may perform some of the steps of FIG. 2. For example, the media system controller 106 may determine the sequence of commands required to enter the hidden service-configuration menu and then pass the sequence of commands to the portable configuration device 138 for transmission. In another example, the portable configuration device 138 shown in FIG. 1 may simply act as the user interface 156 and all the other steps described may be performed by the media system controller 106; STBs 130, 116; and other components in the media system 100 such as in-room IR blaster 134.

Although the description of the invention has been described as being utilized at a hotel, the present invention is equally applicable to other hospitality related locations and services such as hotels, motels, resorts, hospitals, apartment/townhouse complexes, restaurants, retirement centres, cruise ships, busses, airlines, shopping centres, passenger trains, etc. Similarly, the present invention is also useful outside the hospitality industry. As such, the words "guest" and "staff" in the description are meant to help the reader with an understanding of the invention only. In actual practice, their meanings should be expanded to encompass other users and situations, including where staff and guest both refer to the same person. For example, an individual user may find the configuration device 138 and method of the present invention useful so that the individual user does not need to keep track of the commands required to enter hidden service-configuration menus for each of their home entertainment devices. Additionally, the various separate configurations, elements, features, and modules of the invention described above may be integrated or combined into single units. For example, a high definition television or projector may incorporate the functions of a STB. Similarly, functions of single units may be separated into multiple units. Unless otherwise specified, features described may be implemented in hardware or software according to different design requirements. Additionally, all combinations and permutations of the above described features and configurations may be utilized in conjunction with the invention.

What is claimed is:

1. A hospitality media system comprising:
   a media system controller coupled to a computer network, the media system controller including a storage device storing therein a configuration database of a plurality of information pertaining to a plurality of configurable devices installed throughout a plurality of guest rooms of a hospitality establishment, wherein the storage device stores which of a plurality of types of the configuration devices are installed in each of the guest rooms along with a respective sequence of commands required for entering a hidden service-configuration menu for each of the types; and
   a portable configuration device including a network interface, a transmitter, a user interface, and one or more processors;
   wherein, by the one or more processors of the portable configuration device executing a software application program, the one or more processors are operable to:
   access the information of the configuration database via the computer network;
   allow a user of the portable configuration device to interact with the user interface in order to select a particular guest room of the hospitality establishment, the particular guest room being one of the plurality of guest rooms of the hospitality establishment;
   generate a list of configuration devices installed in the particular guest room according to the information of the configuration database;
   display the list on the user interface of the portable configuration device and allow the user to interact with the user interface in order to select a target configurable device from the list;
   look up the respective sequence of commands to enter the hidden service-configuration menu of the target configurable device as stored in the information of the configuration database according to a type of the target configurable device; and
   transmit the respective sequence of commands to the target configurable device utilizing the transmitter.

2. The hospitality media system of claim 1, wherein the one or more processors are operable to display on the user interface a grid of at least some of the guest rooms at the hospitality establishment and then allow the user to select the particular guest room by selecting one of the guest rooms displayed on the grid.

3. The hospitality media system of claim 1, wherein the one or more processors are operable to allow the user to select the particular guest room by allowing the user to specify a room number utilizing an input field available on the user interface.

4. The hospitality media system of claim 1, wherein:
   the network interface includes a wireless network transceiver for coupling the portable configuration device to a wireless access point of the computer network; and
   the one or more processors of the portable configuration device access the information of the configuration database via the wireless network transceiver.

5. The hospitality media system of claim 1, wherein the one or more processors of the portable configuration device access the information of the configuration database via the computer network in order to cache a local copy of the configuration database in a local storage device of the portable configuration device.

6. The hospitality media system of claim 5, wherein the one or more processors of the portable configuration device are operable to generate the list of which of the configuration devices are installed in the particular room and look up the respective sequence of commands to enter the hidden service-configuration menu of the target configurable device by accessing the information of the configuration database as stored in the local copy.

7. The hospitality media system of claim 1, wherein the configuration database further stores an indication of whether each of the configurable devices needs to be configured and the user interface indicates to the user which of the configuration devices installed in the particular room selected by the user need to be configured.

8. A hospitality media system comprising:
   a media system controller coupled to a computer network, the media system controller including a storage device storing therein a configuration database of a plurality of information pertaining to a plurality of configurable devices installed throughout a plurality of guest rooms of a hospitality establishment; and
   a portable configuration device including a network interface, a transmitter, a user interface, and one or more processors;
   wherein, by the one or more processors of the portable configuration device executing a software application program, the one or more processors are operable to:
   access the information of the configuration database via the computer network;

allow a user of the portable configuration device to interact with the user interface in order to select a particular guest room of the hospitality establishment, the particular guest room being one of the plurality of guest rooms of the hospitality establishment;

generate a list of configuration devices installed in the particular guest room according to the information of the configuration database;

display the list on the user interface of the portable configuration device and allow the user to interact with the user interface in order to select a target configurable device from the list;

generate a sequence of commands to enter a hidden service-configuration menu of the target configurable device according to the information of the configuration database and to further perform an installation script for the target configurable device after entering the hidden service-configuration menu; and transmit the sequence of commands to the target configurable device utilizing the transmitter.

9. The hospitality media system of claim 1, further comprising a plurality of portable configuration devices thereby allowing a plurality of users to configure separate configurable devices in different guest rooms of the hospitality establishment at a same time.

10. The hospitality media system of claim 1, wherein the transmitter is an infrared transmitter.

11. A method comprising:

accessing a plurality of information of a configuration database by a portable configuration device via a computer network, wherein the configuration database is stored at a system controller coupled to the computer network and the information pertains to a plurality of configurable devices installed throughout a plurality of guest rooms of a hospitality establishment;

storing in the configuration database which of a plurality of types of the configuration devices are installed in each of the guest rooms along with a respective sequence of commands required for entering a hidden service-configuration menu for each of the types;

allowing a user of the portable configuration device to interact with a user interface of the portable configuration device in order to select a particular guest room of the hospitality establishment, the particular guest room being one of the plurality of guest rooms of the hospitality establishment;

generating a list of configuration devices installed in the particular guest room by the portable configuration device according to the information of the configuration database;

displaying on the user interface of the portable configuration device the list and allowing the user to interact with the user interface in order to select a target configurable device from the list;

looking up the respective sequence of commands to enter the hidden service-configuration menu of the target configurable device as stored in the information of the configuration database according to a type of the target configurable device; and transmitting the respective sequence of commands from the portable configuration device to the target configurable device.

12. The method of claim 11, further comprising displaying by the user interface a grid of at least some of the guest rooms at the hospitality establishment and then allowing the user to select the particular guest room by selecting one of the guest rooms displayed on the grid.

13. The method of claim 11, further comprising allowing the user to select the particular guest room by allowing the user to specify a room number utilizing an input field available on the user interface.

14. The method of claim 11, wherein:

the portable configuration device includes a wireless network transceiver for coupling the portable configuration device to a wireless access point of the computer network; and the method further comprises:

accessing the information of the configuration database by the portable configuration device utilizing the wireless network transceiver.

15. The method of claim 11, further comprising accessing the information of the configuration database via the computer network by first caching a local copy of the configuration database in a local storage device of the portable configuration device and then accessing the local copy.

16. The method of claim 11, wherein the configuration database further stores an indication of whether each of the configurable devices needs to be configured and the method further comprises indicating to the user which of the configuration devices installed in the particular room selected by the user need to be configured.

17. The method of claim 11, further comprising, prior to transmitting the respective sequence of commands from the portable configuration device to the target configurable device, adding additional commands to the respective sequence to further perform an installation script for the target configurable device after entering the hidden service-configuration menu of the target configurable device.

18. The hospitality media system of claim 1, wherein, prior to transmitting the respective sequence of commands from the portable configuration device to the target configurable device, the one or more processors of the portable configuration device are operable to add additional commands to the respective sequence to further perform an installation script for the target configurable device after entering the hidden service-configuration menu of the target configurable device.

19. The hospitality media system of claim 8, wherein the transmitter is an infrared transmitter.

20. The method of claim 11, further comprising transmitting the respective sequence of commands from the portable configuration device to the target configurable device utilizing an infrared transmitter.

* * * * *